(12) United States Patent
Newton

(10) Patent No.: US 6,884,255 B1
(45) Date of Patent: Apr. 26, 2005

(54) IDENTIFICATION AND COMMUNICATION SYSTEM FOR INFLATABLE DEVICES

(75) Inventor: Michael David Newton, Gwent (GB)

(73) Assignee: Huntleigh Technology, PLC, Luton (GB)

( * ) Notice: Subject to any disclaimer, the term of this patent is extended or adjusted under 35 U.S.C. 154(b) by 0 days.

(21) Appl. No.: 09/509,265

(22) PCT Filed: Jul. 23, 1999

(86) PCT No.: PCT/GB99/02403

§ 371 (c)(1), (2), (4) Date: Jul. 25, 2000

(87) PCT Pub. No.: WO00/06904

PCT Pub. Date: Feb. 10, 2000

(30) Foreign Application Priority Data

Jul. 25, 1998 (GB) .............................. 9816173

(51) Int. Cl.[7] .............................................. A61B 17/00
(52) U.S. Cl. ..................................................... 606/202
(58) Field of Search .............................. 340/10.1, 10.3; 606/201–203

(56) References Cited

U.S. PATENT DOCUMENTS

| 3,570,495 | A | * | 3/1971 | Wright ........................ 606/202 |
| 4,694,409 | A | * | 9/1987 | Lehman ....................... 700/282 |
| 5,069,219 | A | * | 12/1991 | Knoblich .................... 600/492 |
| 5,174,281 | A | * | 12/1992 | Lee .............................. 601/45 |
| 5,193,549 | A | * | 3/1993 | Bellin et al. ................. 600/499 |
| 5,518,021 | A | * | 5/1996 | Loureiro Benimeli ...... 137/224 |
| 5,681,339 | A | * | 10/1997 | McEwen et al. ............ 606/202 |
| 5,741,294 | A | * | 4/1998 | Stromberg ................... 606/201 |
| 5,830,164 | A | * | 11/1998 | Cone et al. .................. 601/152 |
| 5,876,359 | A | * | 3/1999 | Bock et al. ................. 601/150 |
| 5,938,634 | A | * | 8/1999 | Packard ....................... 604/29 |
| 5,966,083 | A | * | 10/1999 | Marsh et al. ............ 340/10.42 |
| 6,070,687 | A | * | 6/2000 | Wallace et al. ............. 180/287 |
| 6,148,888 | A | * | 11/2000 | Loureiro Benimeli ...... 152/415 |
| 6,361,548 | B1 | * | 3/2002 | McEwen ..................... 606/201 |

FOREIGN PATENT DOCUMENTS

| GB | 2214678 | * | 9/1989 |
| GB | PCT/GB99/02403 | * | 9/1989 |
| GB | 2264360 | | 8/1993 |
| GB | 2323453 | * | 9/1998 |
| WO | WO94/04398 | * | 3/1994 |
| WO | WO96/14785 | * | 5/1996 |
| WO | WO00/06904 | * | 2/2000 |

* cited by examiner

Primary Examiner—Kevin T. Truong
Assistant Examiner—Charles H. Sam
(74) Attorney, Agent, or Firm—Brown Raysman Millstein Felder & Steiner

(57) ABSTRACT

A pneumatic system consists of an inflatable/deflatable article, for example, a compression garment (21) connected to a pump (20) by connectors (12 and 11), respectively. The connector (12) attached to the garment (21) carries an RFID transponder (30) and a corresponding radio circuit (31) is located within the pump (20). In use, the transponder (30) transmits and receives information to and from the pump radio circuit (31). The information exchanged is used by the pump control system to activate the pump and to operate the pump to provide the particular operating parameters for that garment, for example, pressure, inflation/deflation cycle, duration of treatment, etc.

9 Claims, 4 Drawing Sheets

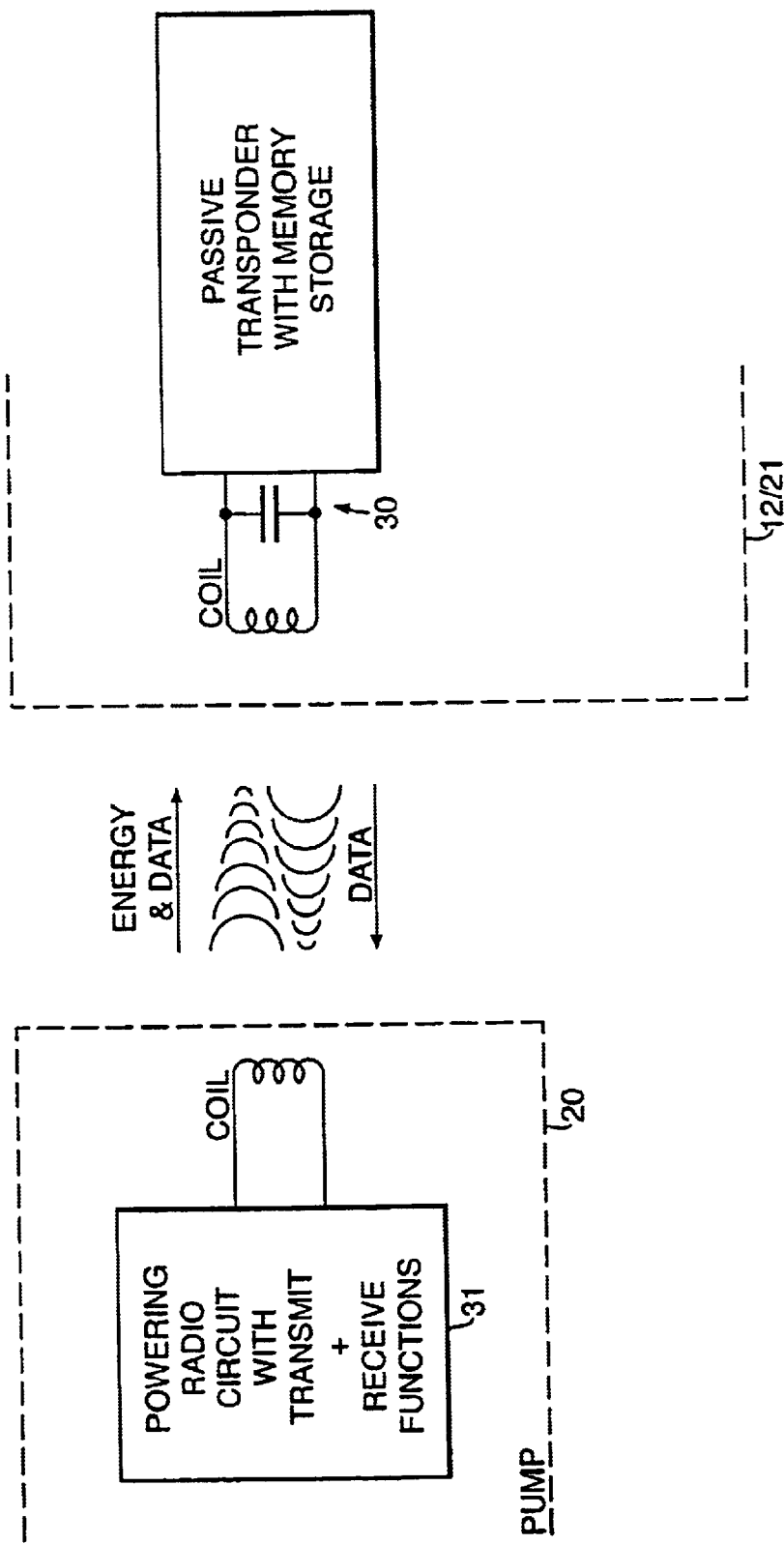

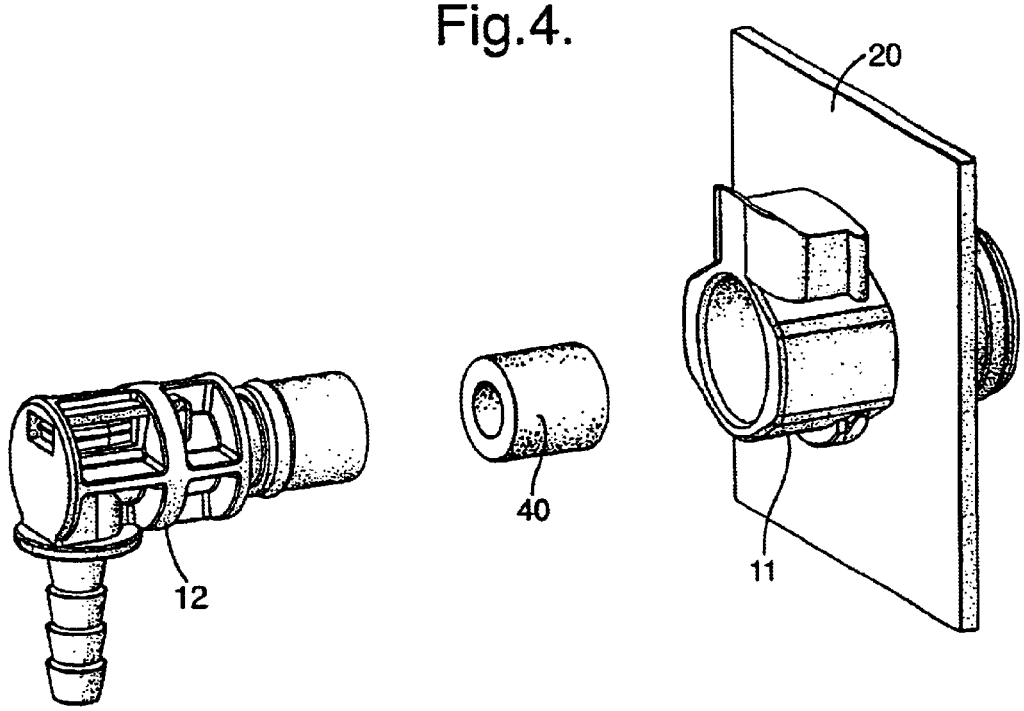

IDENTIFICATION AND COMMUNICATION SYSTEM FOR INFLATABLE DEVICES

BACKGROUND OF THE INVENTION

This invention relates to pneumatic systems and in particular to pneumatic systems having an inflatable/deflatable article connected to a fluid source, for example a pump.

It is known for such systems to have a coupling assembly connecting the article to the fluid source, the coupling assembly comprising a male insert and a cooperating female receptacle for receiving the male insert so as to form a coupled state. The male insert or female receptacle includes a mechanical latch cooperating with a cavity on a corresponding surface of the other for mechanically latching and unlatching the coupling assembly, the male insert member and the female receptacle both defining a pathway for the flow of fluid through it when in the coupled state. A seal member extends between the male insert member surface and the surface of the female receptacle to provide a fluid tight seal when in the coupled state.

WO96/14785 describes a pneumatic system comprising an inflatable mattress connected to a pump by a connector mounted on the end of a fluid line from the inflatable mattress, the connector being mechanically inoperable upon disconnection with the pump. In this way, the connector ensures that the inflatable mattress is used only once, for reasons of clinical safety.

However, such pneumatic systems of the prior art including connectors that prevent re-use are not able to distinguish between different articles to be inflated or different pumps.

Modern technology has now made it possible to design a pump to be programmable so that a number of different inflatable articles with differing inflating and/or deflating arrangements fulfilling totally different functions may be attached to a physically identical pump. Thus, there is a need for an intelligent means associated with the pump and/or the article able to identify or distinguish between the pump and the article connected, and further to control the operation of the pump appropriate to the article connected.

SUMMARY OF THE INVENTION

The invention provides a pneumatic control system including a pump and at least one inflatable/deflatable article, control means for operation of the pump, connection means for connecting the article and pump for fluid flow therethrough, communication means provided on each, of the pump and article, wherein upon connection between the pump and article at least one of said communication means is capable of identifying the article and instructing the control means to activate the pump accordingly.

Preferably, the communication means are capable of exchanging information or energy so as to identify the article as that compatible to the pump and more preferably instruct the pump control means to operate a predetermined inflation and/or deflation of the article.

The information exchange between the article and the pump may comprise information contained in the article communication means being read by the pump communication means and used by the pump control means to operate the pump, or information contained in the article communication means being read by the pump communication means, and information modified/generated within the pump communication means being stored within the article communication means during use. The information exchange may be by means of an energy source which may include but not be limited to electrical, pneumatic, acoustic, magnetic, electromagnetic or optical signals.

The modified information or energy transmitted to the pump is used to identify the article and thereafter used to control the pump operation either without user interface or to signal the user to operate the pump as indicated. Thus, operation of the pump may be altered automatically to match the requirements of the article to be inflated/deflated and its application.

Preferably, the information may include specific information, i.e. codes, to identify the article and/or its mode of operation (including pressure and flow versus time profile, and alarm settings) and/or security markings, to prevent unauthorised use.

In a preferred embodiment, the communication means on the article is located within the connection means connecting the article to the pump. Preferably, during use the respective communication means do not contact each other.

Examples of information contained within the article communication means may include some or all of the following data:—

(i) Article serial number—for traceability in the event of customer complaint, product modification, recall or product ownership.

(ii) Article manufacturing date—the pump communication means can automatically infer that an article with a limited storage time from manufacture to use is out of time and therefore will not operate the pump, indicating so on the operator panel. This would be relevant to the case of single use sterile articles where the sterile packaging has a limited lifetime.

(iii) Article type information—the pump communication means reads the code and identifies the code as that to be used by the pump and sets up the correct pressure and flow versus time profiles on the air delivery paths automatically. Also the communication means on the pump can indicate to the user on the pump operator panel which application or applications the pump/article combination is intended for.

(iv) Single use/re-use information—indicates to the pump communication means to display on the operator panel whether the connected article is designed for re-use or for single use only.

(v) Duration of use information—this could either be in the form of the article in-use running hours or number of pressure time cycles per use or the actual times recorded when used. If this information is fed by the pump communication means back to the article communication means then it can be read by any pump communication means on subsequent usage. In this way users can be signalled when articles have reached the end of their operating life and for either clinical efficacy or safety reasons should no longer be used and whether user compliance of prescribed therapy has been administered. Also, the pump could be automatically shut-off or instructed to give appropriate warnings at the end of operating life/use.

(vi) Single Use Information—if the article communication means indicates application for single use only then the pump communication means can input in the article communication means, an indication that the article has already been used. On subsequent attempts to use the article the pump communication means will recognise single use has occurred and not operate. In this case the clinical efficacy and safety of a single use article can be preserved automatically.

(vii) Limited or Multiple Re-use—if this is indicated within the article communication means then the pump communication means will automatically clock up the number of use cycles, put the information into the article communication means, and when the designed number of use cycles has been reached, the pump can automatically indicate this to the user so preserving clinical safety and efficacy.

(viii) Re-usable clinical articles after being re-processed (consequent to use to eliminate cross-contamination between users)—here the pump communication means looks for an indication from the article communication means that the article has been validly reprocessed between use cycles. This validity information is placed in the article communication means at the reprocessing facility using an approved piece of equipment. In this way only approved reprocessing which maintains clinical efficacy and safety will be accepted by the pump for use.

Another aspect of the invention provides for the use of the information exchange outlined above, in the field of intermittent compression therapy and pressure area care.

Therefore, a preferred embodiment of the invention provides a pneumatic control system including a pump and an inflatable/deflatable support for a patient to lie on, control means to operate the pump, connection means for connecting the support and pump for fluid flow therethrough, wherein the pump and support have respective communication means, at least one said means capable of identifying the article and to instruct the pump control means to activate the pump accordingly.

Preferably, the said communication means are capable of exchanging information or energy to identify the support and to instruct the pump control means to operate the pump to provide a predetermined inflation/deflation of the support for a patient lying thereon. More preferably, the support communication means may be located within the connection means connecting the support to the pump.

A further preferred embodiment of the invention provides a pneumatic control system including a pump and at least one inflatable/deflatable garment to be wrapped around a user's limb, control means to operate the pump, connection means for connecting the garment and pump for fluid flow therethrough, wherein the pump and garment(s) have respective communication means, at least one said means capable of identifying the garment(s) and instructing the pump control means to activate the pump accordingly.

Preferably, the said communication means are capable of exchanging information or energy to identify the garment(s) and to instruct the pump control means to activate the pump accordingly and more preferably to further operate the pump to provide a predetermined inflation/deflation cycle of the garment(s) suited to the garments' application. Preferably, the garment communication means may be located within the connection means connecting the garment to the pump.

The use of communication means to provide pressure area care and compression therapy will result in fewer individual pump models being required for the different care applications, all requiring differing pneumatic performance criteria and operator interfaces. This will lead both to manufacturing economies of scale and substantial acquisition, storage and inventory cost reductions, which is particularly beneficial within the cost sensitive and resource limited healthcare establishments where such care applications are generally used.

The communication means can be separately applied to pumps and to the garments and supports so long as the air delivery path configurations are functionally compatible. Thus pumps could operate such articles yet to be developed so long as the articles have their operating characteristics configured in a compatible communication means attached thereto.

In a healthcare environment this use of communication means prevents the inadvertent and unsafe operation of pump types with inflatable garments or supports e.g. pads or mattresses, which are not functionally safe or clinically compatible. A pump equipped with the communication means will readily deliver safe, effective therapy with a wide range of such inflatable articles.

The communication means of the present invention for information exchange between an article and a pump to control operation of the pump may comprise conventional read and write information systems; examples of which, include bar code, magnetic stripe coding, insertion/rotation of co-operating connectors when connecting an article to the pump; geometry or intensity of magnetisation or transmissive or reflective optical path read by sensors; unique combinations of mechanical shapes read by mechanical switches or electronic memory chip with memory retention without power, for example, flash memory or EEPROM or UV EPROM.

BRIEF DESCRIPTION OF THE DRAWINGS

Preferred embodiments of the present invention are described below, by way of example only, with reference to the accompanying drawings in which:

FIG. 3 shows a typical radio communication means comprising a passive transponder and powering radio circuit.

DETAILED DESCRIPTION OF THE PREFERRED EMBODIMENTS

Figure 1:
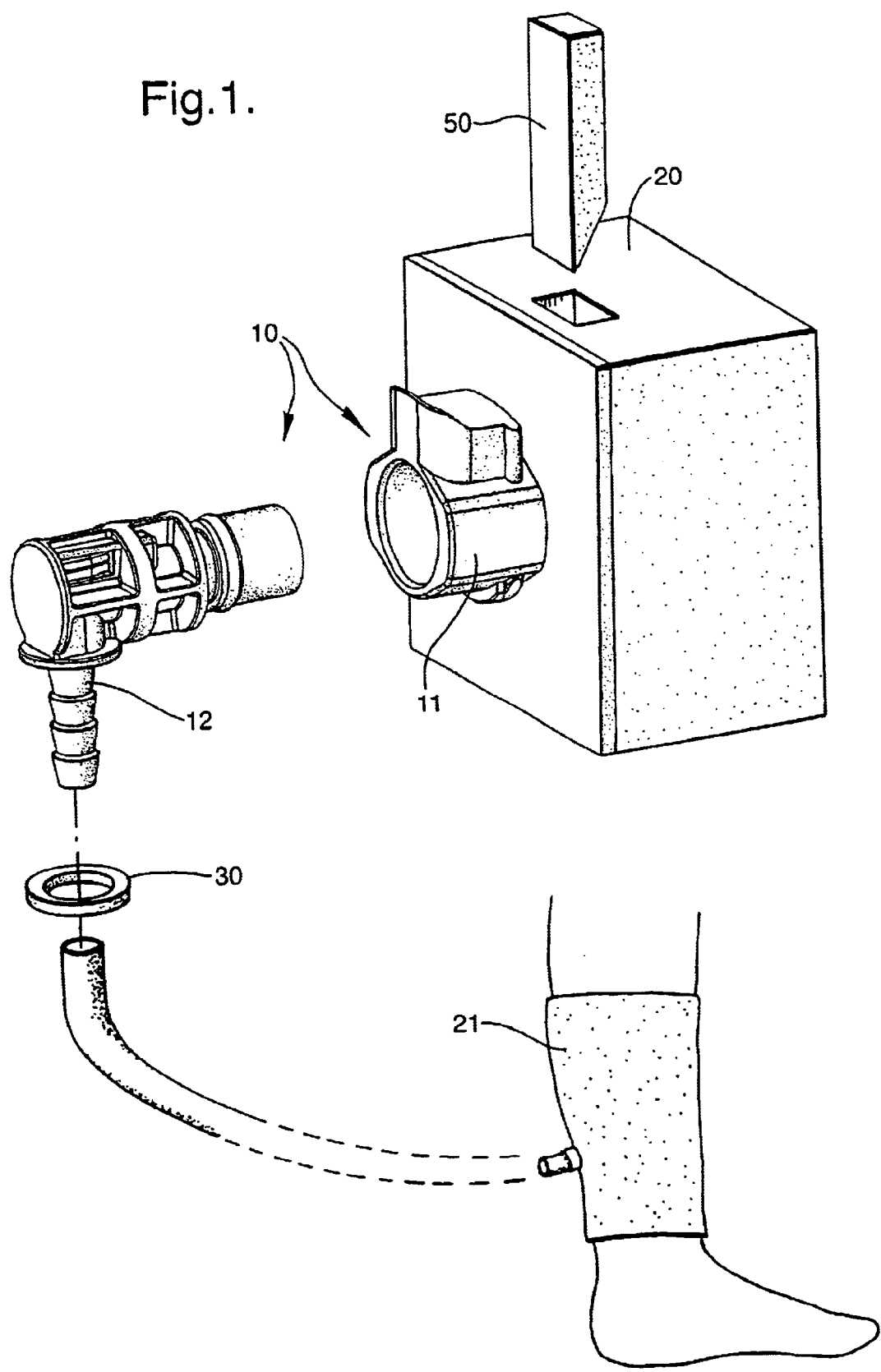
FIG. 1 shows a schematic diagram of a communication means according to the present invention.
Figure 2:
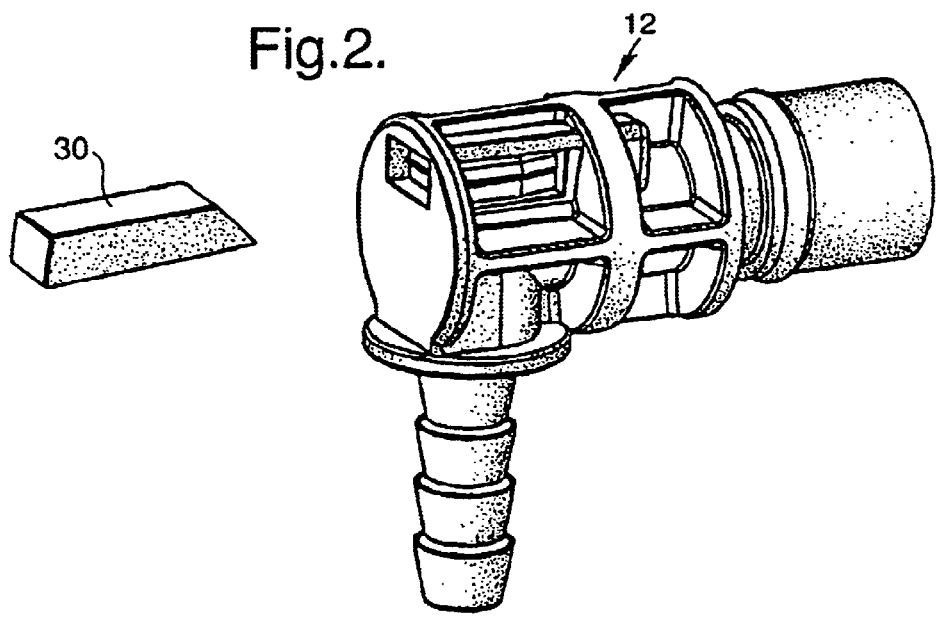
FIG. 2 shows an alternative method of mounting one element of the communication means to that in FIG. 1.

Referring to FIG. 1, the preferred embodiment consists of a pneumatic system consisting of a compression garment 21 connected to a pump 20 by a connector 10. The connector 10 has a connector part 11 connected to the pump 20 and a cooperating connector part 12 connected to the fluid line of the garment 21. The connector 12 carries a radio frequency identification device 30, i.e. a transponder. The transponder 30 is mounted on the connector part 12 connecting the compression garment 21 to the pump 20 and a corresponding radio circuit is located within the pump 20. The transponder 30 may be in the shape of an annular ring fitted to the connector part 12 surrounding its fluid line outlet or any suitable shape to fit on or adjacent the connector 12. The transponder 30 typically comprises a coil acting as an antennae to transmit and receive signals, a capacitor to temporarily store energy to power the transponder, an integrated circuit to provide control and modulation functions and a read/write electronic memory (EEPROM). The transponder 30 is used to transmit and receive information to and from the pump radio circuit 31. As shown in FIG. 3, radio circuit 31 in the pump comprises coils located close to the pump outlet to provide for transponder power and two-way communication between the transponder 30 and the circuit 31. The transponder 30 is passive and does not need any power to store information. It is energised by coming into proximity with the coils of the radio circuit 31 in the pump 20 and can then communicate with the pump circuit 31. As the transponder 30 does not need power to store information there is no need for connection cables or batteries and it may be completely sealed after assembly, within connector part 12 attached to the compression article 21.

The communication between the transponder 30 and pump 20 is controlled by hardware and software within the pump.

The operation of the pump 20 is programmable, specifically the operation in terms of applied pressure and flow versus time profiles and alarm monitoring. This is achieved by having the key parameters which control this operation stored in the transponder 30 to be read by the radio circuit 31 in the pump 20 and used to operate the pump accordingly. Thus by changing the garment 21 the operation of the pump 20 may be changed and hence the pump 20 may be programmable by the garment 21.

The general approach is for the pump software to signal to the transponder via the radio link a request to transmit certain operational parameters. These are received by the pump radio link and used as a basis to operate the pump. For example, if the pressure is specified for the article then the pump will provide that particular pressure.

It is the information stored in the transponder within the connector on the article which indicates to the pump to operate accordingly.

Specific examples of parameters include:

Operating parameters—operating pressure level, pressure versus time inflation rate, pressure versus time deflation rate, duration of inflation, duration of period between inflation's.

Alarm parameters, the pressure at which an inflation characteristic is detected, time at which this is tested, number of fault conditions prior to alarm occurring. This would be duplicated for each alarm condition.

In use, the connector parts 11, 12 are joined together. The transponder 30 within the garment connector part 12 when coming into the vicinity of the pump's radio circuit 31 is powered and responds by transmitting a signal to the pump radio circuit 31. The radio circuit 31 may request further information from the memory of the transponder 30 or it may modify some of the transponder memory 30. The pump 20 processes the information it has read from the transponder 30 and accordingly provides the specific inflation requirements for that garment 21.

The pump 20 is reconfigured after any break in its operation, for reasons of it being switched off, powered off or another garment being connected.

The radio circuit 31 reads the information within the transponder 30 memory on the connector part 12 of the garment 21 and identifies the garment 21 and if the information is compatible with that held within the pump 20 either electronically or within the software, then the pump operates the garment 21 according to the information transmitted by the transponder 30. In the case of single-use garments, the transponder memory 30 may contain additional control information which instructs the pump not to re-inflate or not to inflate after a certain time or any other parameter based decision process. Additionally, the radio circuit 31 may modify the transponder 30 memory to prevent further re-use of the garment 21 upon re-connection with the or another pump.

The pump 20 may be configured so that it is solely dependent on the transponder 30 memory to provide information regarding the inflation requirements of the garment 21 attached. This allows for new garments to be connected and operated by the pumps without the pumps' having to be upgraded.

The pump radio circuit 31 and transponder 30 could exchange information about the following:

The transponder 30 in the garment 21 could be used to store information about the pump's own operational history—e.g. time since last service, alarm history, degree of utilisation etc. This information could then be accessed by the manufacturer or its agents without physically having to gain access to the pump. This is an advantage where the pumps are spread widely geographically or where access is restricted due to commercial reasons.

The opposite arrangement is also possible where the pump radio circuit 31 captures all the usage information stored within the garment transponder 30 (which could be a history involving many pumps). During servicing of the pump 20 the information is accessed as part of the service procedure.

This sort of information would allow better understanding of the actual pump/garment usage in healthcare establishments which may provide useful information for commercial, product reliability and quality and clinical efficacy purposes.

The facility to remotely upgrade the operation/disable use/enable use of the pump is possible.

The pump could include a transponder itself to self check that its own radio circuit 31 is working and further could be adapted to accommodate an external transponder 50. The transponder 50 may be in the form of a programming key which when connected to the pump 20, in the vicinity of the radio circuit 31 would specifically configure the operation of the pump 20 and garments 21 together as a system for a specific patient in a healthcare environment. This key could be configured by a physician for a particular patient's requirements. The key would override any existing settings stored in the pump and/or garments and ensure that the required pump operation occurred. Thus, improved patient compliance and increased product safety and efficacy would result. Other transponders or similar could be used to log operational data for maintenance purposes.

The pneumatic system above describes a pump 20 having a radio circuit 31 communicating with a radio frequency identification device (RFID) 30 on a connector 12 to a garment 21. The radio circuit 31 within the pump 20 also contains a phase detection circuit which can be used to detect any change of phase due to external influences and this principle may be employed as an alternative communication means for the pneumatic system.

A number of materials can be used to change the phase of the coil 31, examples are shown in table 1.

| Material | Phase Change in Degrees |
|---|---|
| Magnetically loaded plastic | +45 |
| Torrid Core | +11 |
| Amorphous metal strip | +50 |
| Steel Core | −17 |
| Cable screen ferrite 10 mm | +62 |
| Cable screen ferrite 5 mm | +28 |
| Brass Core | −22 |

In the case of brass the introduction into the coil field 31 lowers the phase detected by the phase detector, and conversely the use of ferrite increases the phase detected, resulting in different values for differing materials. The phase angle change can be controlled by the amount of material within the coil field and by this method several identities can be detected.

FIG. 4 shows an alternative system using the pump 20 as in FIG. 1 and a connector 12 to a garment 21 (not shown), the connector 12 having communication means including an annular ring of ferrite 40 around the fluid line outlet.

Figure 4A:
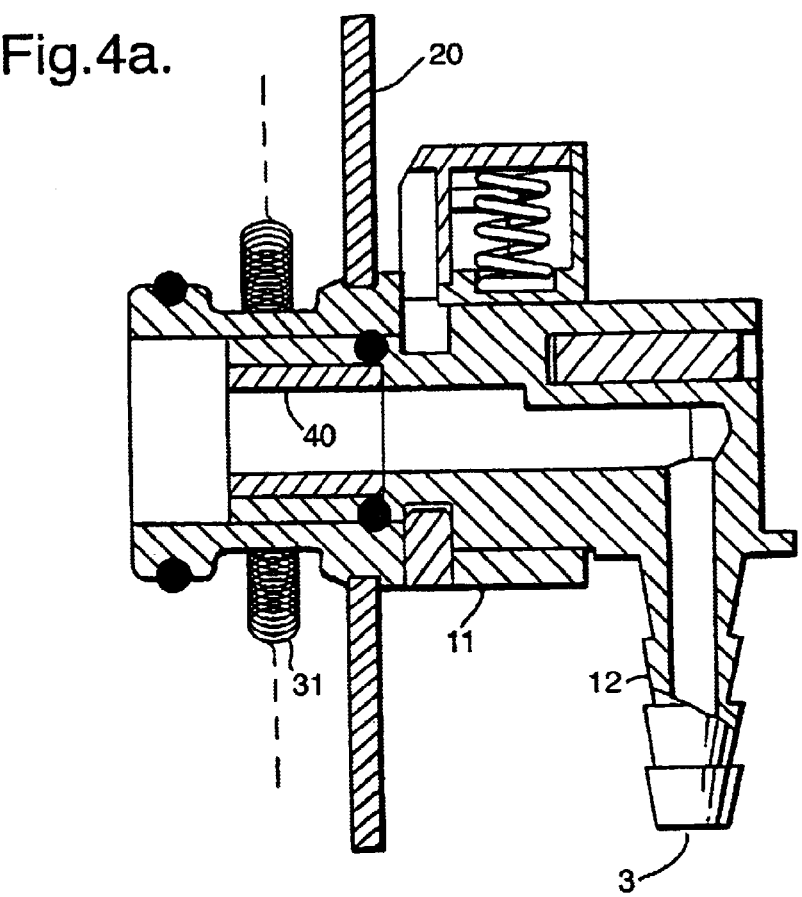
FIG. 4 shows an alternative embodiment of a communication means.

In use, as shown in FIG. 4a the connector parts 11, 12 are joined together. The ferrite 40 when coming into the vicinity of the pump's radio circuit 31 increases the phase detected by the phase detection circuit within the pump 20 and accordingly identifies the garment 21 (not shown) and if the phase change information is held to be compatible with the pump 20 either electronically or within the software, then the pump 20 may be operated to provide the therapy required.

While the preferred embodiments describe intermittent garments incorporating connectors having various types of communication means, it is understood that mattresses as well as any other inflatable/deflatable articles may be similarly connected and inflated/deflated using the same principles according to the invention. Moreover, the respective communication means within the article and the pump may be located elsewhere than the connectors as in the preferred embodiment, for example, within the inflatable article and/or pump casing. The preferred embodiments have described connectors using a means of information exchange or identification incorporating a radio frequency identification device (RFID) or ferrite material respectively, however any other forms of information exchange devices as discussed earlier or as would be apparent to those skilled in the art are within the scope of the invention.

What is claimed is:

1. A pneumatic control system including a pump and at least one inflatable/deflatable article useful in the clinical treatment of patients, control means for operation of the pump, connection means for connecting the article and pump for fluid flow therethrough, and communication means provided on at least one of the pump, the article, and the connection means, wherein upon connection between the pump and the connection means said communication means is capable of instructing the control means to effect a predetermined compression therapy profile for a patient, the profile comprising at least one inflation and at least one deflation.

2. A pneumatic control system including a pump and at least one inflatable/deflatable article, control means for operation of the pump, connection means for connecting the article and pump for fluid flow therethrough, and communication means provided on at least two of the pump, the article, and the connection means, wherein the communication means are capable of exchanging information or energy so as to identify the article as compatible to the pump and do not contact each other.

3. A pneumatic control system for use in controlling the inflation and/or deflation of a support useful for the clinical treatment of patients, including a pump and an inflatable/deflatable support for a patient to lie on, control means to operate the pump, and connection means for connecting the support and pump for fluid flow therethrough, wherein the pump and at least one of the support and the connection means have respective communication means, and wherein upon connection between the pump and the connection means at least one said communication means is capable of identifying the support and to instruct the pump control means to activate the pump accordingly.

4. A pneumatic control system as claimed in claim 3, wherein the said communication means are capable of exchanging information or energy to identify the support and to instruct the pump control means to operate the pump to provide a predetermined inflation/deflation of the support for a patient lying thereon.

5. A pneumatic control system as claimed in claim 3, wherein the support communication means is located within the connection means connecting the support to the pump.

6. A pneumatic control system including a pump and at least one inflatable/deflatable garment to be wrapped around a portion of a patient's body, control means to operate the pump, connection means for connecting the at least one garment and pump for fluid flow therethrough, wherein the pump and at least one of the garment and the connection means have respective communication means, and wherein upon connection between the pump and the connection means at least one of said communication means is capable of identifying the at least one garment and instructing the pump control means to activate the pump.

7. A pneumatic control system as claimed in claim 6, wherein the communication means are capable of exchanging information or energy to identify the at least one garment and to instruct the pump control means to operate the pump to provide a predetermined inflation/deflation cycle of the at least one garment suited to the garments' application.

8. A pneumatic control system as claimed in claim 6, wherein the garment communication means is located within the connection means.

9. A pneumatic control system for an inflatable/deflatable article useful in the clinical treatment of patients, the pneumatic system comprising control means for operation of a pump, connection means for connecting the article and pump for fluid flow therethrough, communication means provided on at least one of the pump, the article, and the connection means, wherein upon connection between the pump and the connection means the communication means is capable of identifying a predetermined pressure versus time profile for the article, the pressure versus time profile comprising a plurality of predetermined pressures.

* * * * *